US005787782A

United States Patent [19]
Downard et al.

[11] Patent Number: 5,787,782
[45] Date of Patent: Aug. 4, 1998

[54] REVERSIBLE BEAM-CUTTING SAW GUIDE

[75] Inventors: Owen R. Downard; Kim W. Nilsen, both of Hailey, Id.

[73] Assignee: GK, L.L.C., Hailey, Id.

[21] Appl. No.: 782,836

[22] Filed: Jan. 13, 1997

Related U.S. Application Data

[63] Continuation of Ser. No. 398,536, Mar. 6, 1995, abandoned.

[51] Int. Cl.$^6$ ............................................. B27B 9/04
[52] U.S. Cl. ........................................ 83/574; 83/745
[58] Field of Search ........................ 83/DIG. 2, 745, 83/574; 33/640, 562, 566, 464

[56] References Cited

U.S. PATENT DOCUMENTS

| | | | |
|---|---|---|---|
| 3,896,692 | 7/1975 | Stubbs | 83/471.3 |
| 4,054,077 | 10/1977 | Gram | 83/745 |
| 4,135,419 | 1/1979 | Chapin | 83/745 X |
| 4,307,513 | 12/1981 | Genge | 83/745 X |
| 4,503,615 | 3/1985 | Schreiber | 83/464 X |
| 4,509,398 | 4/1985 | Mason | 83/574 X |
| 4,619,170 | 10/1986 | Maier et al. | 83/745 |
| 4,867,425 | 9/1989 | Miraglia, Jr. | 83/745 X |
| 4,919,384 | 4/1990 | Gimberg | 83/745 X |
| 4,945,799 | 8/1990 | Knetzer | 83/745 |
| 4,977,938 | 12/1990 | Greeson | 83/745 X |
| 5,103,566 | 4/1992 | Stebe | 83/745 X |
| 5,155,918 | 10/1992 | Hummer, Jr. | 83/745 X |
| 5,181,326 | 1/1993 | Eberline | 33/464 X |
| 5,182,975 | 2/1993 | Warner | 83/745 |
| 5,226,345 | 7/1993 | Gamble | 83/745 |
| 5,365,822 | 11/1994 | Stapleton et al. | 83/745 |
| 5,509,338 | 4/1996 | Ekker | 83/745 |

*Primary Examiner*—Maurina T. Rachuba
*Attorney, Agent, or Firm*—Ken J. Pedersen; Barbara S. Pedersen

[57] ABSTRACT

Embodiments of a two-sided or reversible saw guide for cutting I-beams are disclosed. Each embodiment includes a first set of surfaces and a second set of surfaces, with each of the two sets being adapted for use with a different size of I-beam. The first and second sets of surfaces each include a surface or surfaces for bracing the guide in between the edge bars of the I-beam, a surface for supporting the saw, and a surface for guiding the saw as it moves across the I-beam. The first and second sets of surfaces are sized relative to each other so that the guide may be flipped or turned to one orientation for one size of I-beam and then flipped or turned to the second orientation for the second size of I-beam. The preferred guide has the shape of two generally parallel plates connected to each other so that their longitudinal axis are at about 90° to each other, with each plate being sized to fit onto the web section of a different size of I-beam. The guide may be flipped over and turned about 90° to place a plate into the web section of an I-beam, and the two plates cooperate to provide support, guide, and brace surfaces. The guide may optionally include a measuring means, such as a bar-and-stop system that extends out from the guide to measure the distance from an end of the beam to the cutting line.

23 Claims, 4 Drawing Sheets

REVERSIBLE BEAM-CUTTING SAW GUIDE

This application is a continuation of application Ser. No. 08/398,536, filed Mar. 6, 1995, now abandoned.

BACKGROUND OF THE INVENTION

1. Field of the Invention

This invention relates generally to tools for aiding in the cutting of I-beams. More specifically, this invention relates to a two-sided or reversible guide for accurately and easily sawing two different sizes of I-beams or similar construction material.

2. Related Art

A popular wooden beam design used in industrial and residential construction is the I-beam-shaped "TJI"™, available from Trus Joist MacMillan, Ltd. of Boise, Id. This wooden I-beam, illustrated as part of FIG. 1, typically includes a center panel of plywood, called a "web", with a laminated-wood edge bar on each of the two center panel edges, resulting in a strong and yet economical product.

During building construction, these wooden I-beams are typically cut on the job-site into beams of various lengths. In the past, the carpenter has typically marked the desired beam length with a pencil or chalk, by using a ruler or other straight-edge laid perpendicular to the length of the beam across the I-beam edge bars. He typically marks the desired cutting line on the edge bars, but he can rarely accurately mark the web section because of its lying on a lower plane. The carpenter then uses a power saw to cut the I-beam, "eying" the cut as accurately as possible across the center web section of the beam. When cutting from the edge bar into the web section, the saw can dip or twist due to the jolt of moving from a thick piece of wood into a lower, thin piece of wood, thus, causing a potential hazard or at least unstable and inaccurate cutting. Typically, the carpenter repeats this process for each cut, even when a long beam must be cut into several, short "blocks" only a few feet long.

In the past, some carpenters have made a tool for making this cutting process easier. They have nailed a narrow strip of wood perpendicularly across a length of board. They lay the board onto the web section of the I-beam, with the strip acting as a side-guide for the saw.

Still, there is a need for an improved saw guide for easing the job of cutting wooden I-beams and improving accuracy, safety, and efficiency. An improved saw guide is needed that is more convenient, versatile, stable, and comfortable to handle.

SUMMARY OF THE INVENTION

An object of the present invention is an improved saw guide for improving accuracy, precision, and reproducability in the cutting of beams, joists, and other construction materials. Another object of the improved guide of this invention is to provide an economical, light-weight saw guide that will be easily carried, comfortably handled, and kept handy at the job site. Another object of the improved guide is a reversible or double-sided saw guide that may be used with more than one size of I-beam.

The present invention is a two-sided guide for use while measuring, marking, and/or cutting a wooden I-beam or other construction member that typically has a generally flat center panel and two edge pieces or bars connected to the center panel edges to form a conventional I-beam shape. The invented guide is preferably used with wooden I-beams such as those produced by Trus Joist MacMillan, Ltd., but may be used for other applications which require a support surface for supporting a saw and a guide surface for guiding the saw.

The invented guide is "two-sided" in that it includes a first set of surfaces and a second set of surfaces, with each of the two sets being used with a different size of I-beam. The first and second sets of surfaces each include a surface or surfaces for bracing the guide in between the edge bars, a surface for supporting the saw, and a surface for guiding the saw as it moves across the I-beam to cut the beam. The first and second sets of surfaces are sized relative to each other so that the guide may be flipped or turned to one orientation for one size of I-beam and then flipped or turned to the second orientation for the second size of I-beam.

The guide may optionally include a measuring means, such as a bar and a stop that extend out from the guide to measure the distance from an end of the beam to the cutting line. Such a measuring means may be used to quickly place the guide a desired distance from a beam end or a particular point on a beam, for example, for repeatedly making cuts to produce blocks of the same length without repeatedly measuring or marking with a tape measure.

Thus, the invented guide includes bracing, supporting, and guiding surfaces for use with at least two different sizes of I-beams, preferably without adjustment of any movable parts. Also, the guide may include a measuring means to simplify placement of the guide. The guide makes each cut of an I-beam quicker and more precise, thus reducing both the cost of labor and the number of off-size or ruined beams.

DETAILED DESCRIPTION OF THE PREFERRED EMBODIMENTS

Figure 1:
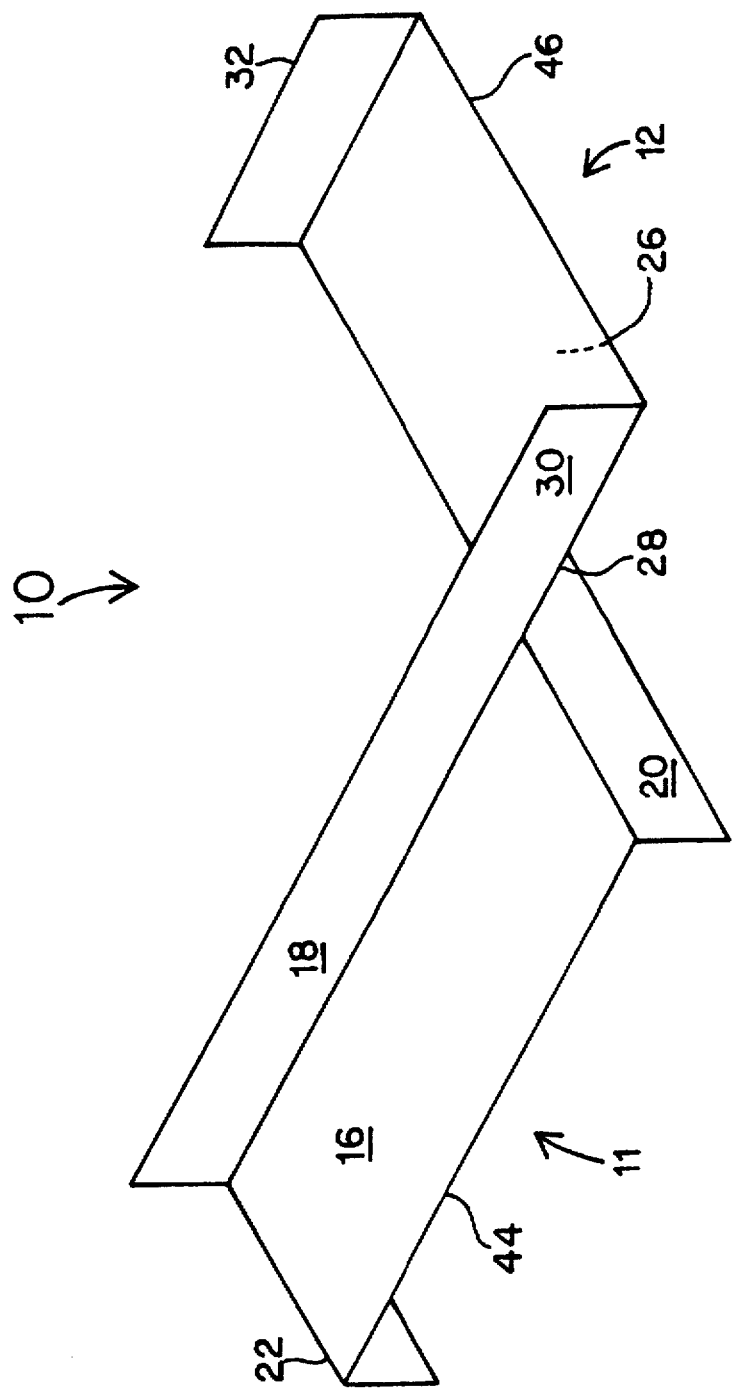
FIG. 1 is an isometric, schematic view of one embodiment of the invention, showing the first and second set of functional surfaces of the guide.

Referring to the Figures, there are shown several, but not the only, embodiments of the invented beam-cutting guide 10, 50. The embodiment shown in FIG. 1 illustrates the first set 11 and second set 12 of functional surfaces important to the fit and function of the guide 10 with the I-beam 14 and the saw 15. The first set of surfaces includes a saw support surface 16, a saw guide surface 18, and bracing surfaces 20, 22. The second set of surfaces 12 includes a saw support surface 26, a saw guide surface 28, and bracing surfaces 30, 32.

When the guide 10 is in the orientation shown in FIG. 1, the first set 11 of surfaces is available for support and guiding of the saw 15 and bracing of the guide 10 on the I-beam 14. The support surface 16 is generally horizontal and facing upward, for supporting a side-extension 33 of the saw table that extends out horizontally from a conventional industrial power saw 15, such as a Skil® Model 77 industrial circular saw. The guide surface 18 upends generally vertically from the support surface 16 to act as a side-ways limiting or guiding surface to keep the saw 15 moving in a straight line along the desired cutting line. The two brace surfaces 20, 22 extend down generally vertically, so that one brace surface may be close to or contact each of the edge bars 34, 36 of the I-beam 14.

The two brace surfaces 20, 22 are spaced apart from each other at a distance approximately equal to the distance between the inner surfaces 38, 40 of the edge bars 34, 36, that is, preferably approximately ⅛–⅜ inch less than the distance between the inner surfaces 38, 40. Thus, the brace surfaces 20, 22 are close to the inner surfaces 38, 40, for creating a good fit of the guide 10 in the web to keep the guide surface 18 steady and parallel to the cutting line, but not so tight against the inner surfaces that the guide 10 binds or gets stuck in the web. Thus, when the guide 10 is placed on top of the I-beam, the brace surfaces 20, 22 make a close-enough fit of the guide 10 in between the bars so that the guide 10 can not substantially rotate or turn to move the guide surface 18 out of parallel alignment with the desired cutting line.

Preferably, the support surface 16 and guide surface 18 extend approximately the entire width of the center panel 42 of the I-beam 14, or, in other words, the entire distance between the inner surfaces 38, 40, for supporting and guiding the saw 15 all the way across the I-beam 14.

The second set of functional surfaces 12, that is, the support surface 26, the guide surface 28, and the bracing surfaces 30, 32, lie generally in the same positions relative to each other as those of the first set 11, except that they are facing to the side and up-side down relative to the first set 11. To place the second set 12 in position for support, guiding, and bracing, the guide 10 is flipped over and turned about 90° and laid down on top of an I-beam having a different width than the I-beam into which the first set 11 of surfaces fits. The distance between the bracing surfaces 30, 32 is designed to be approximately the same as the distance between the inner surfaces of edge bars on the second size of I-beam, or, preferably, about ⅛–⅜ inch less than the distance between the inner surfaces.

For example, I-beams may be produced in a variety of sizes, with two common "TJI"™ sizes, herein called I-Beam₁: 11⅞ inches from edge bar outer surface to outer surface with an 8⅞ inch webbing ("web", or width of the central panel between inner surfaces of the edge bars), and I-beam₂: 9½ inch from edge bar outer surface to outer surface with a 9/12 inch web. I-beams are made in other sizes, but typically most would be larger than about 6 inches wide.

Thus, for example, a guide 10 made for use with I-beam₁ and I-beam₂ described above would have: a first set 11 of surfaces including bracing surfaces 20, 22 about 8⅞ inches apart, and a support surface 16 and guide surface 18 each about 8⅞ inches long (for I-beam₁) and a second set 12 of surfaces including bracing surfaces 30, 32 about 6½ inches apart and support surface 26 and guide surface 28 each about 6½ long (for I-beam₂).

The width of the support surfaces 16, 26, that is, the distance from the guide surface to the outer edge 44, is designed or cut to be approximately equal to the distance from the outer edge of the side-extension 33 of the saw 15 to the saw blade. Thus, the outer edge of the side-extension 33 abuts and moves along the guide surface 18, 28, while the side-extension 33 slides along the support surface 16, 26, and while the saw blade cuts the I-beam close beside the outer edge 44 of the guide.

The width of the support surfaces 16, 26, especially for aluminum or wooden versions of the guide, may be manufactured for a particular style of saw and width of saw side-extension 33. For example, a standard width for the support surface 16, 26 would be 1½ inches, plus or minus 1/16 inch, because this is a standard distance for many industrial saws from the side-extension 33 outer edge to the blade. Alternatively, especially for plastic versions of the guide, the width of the support surfaces 16, 26 may be adjusted by the carpenter to fit his particular saw. To make this adjustment, the carpenter may place his saw against a new guide 10 and saw across an I-beam as in normal use (with the side-extension 33 moving against the guide surface), and, in doing so, the saw trims the outer edge 44 of the guide. During future use, as long as the carpenter uses the same or very similar saw, the saw blade and, hence, the cutting line will be right beside the trimmed outer edge 44 of the guide.

In the preferred embodiment of the guide 50 shown in FIGS. 2–5, the guide 50 extends to take the general shape of two thin box-shapes or rectangular plates on top of each other, generally parallel to each other, and rotated with their lengths about 90° to each other to create the first set 51 and second set 52 of surfaces. The first set 51 includes support surface 56, guide surface 58, and brace surfaces 60, 62. The second set 52 includes support surface 66, guide surface 68, and brace surfaces 70, 72.

The preferred guide 50 includes many optional apertures or cutouts 73 in order to lighten the weight of the guide 50. The central opening 74 through the guide 50 reduces weight and the material needed to build or mold the guide 50, while also providing a convenient and large hole through which the carpenter's hand may grip to easily and quickly grasp and maneuver the guide 50. Some of the cutouts 73 may be eliminated, in order to provide a broader outer surface of the guide 50 on which to place indicia, such as a tradename and the I-beam sizes for which the guide 50 is designed, or as a place to bolt or otherwise secure a measuring means.

Figure 4:
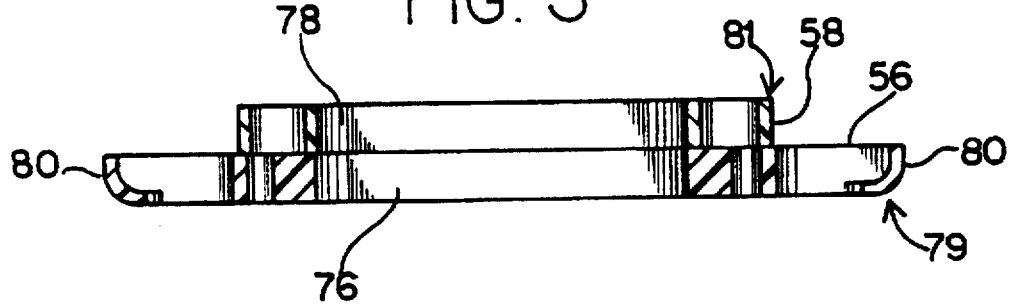
FIG. 4 is a cross-sectional view of the embodiment of FIG. 3, along line 4—4 in FIG. 3.
Figure 5:
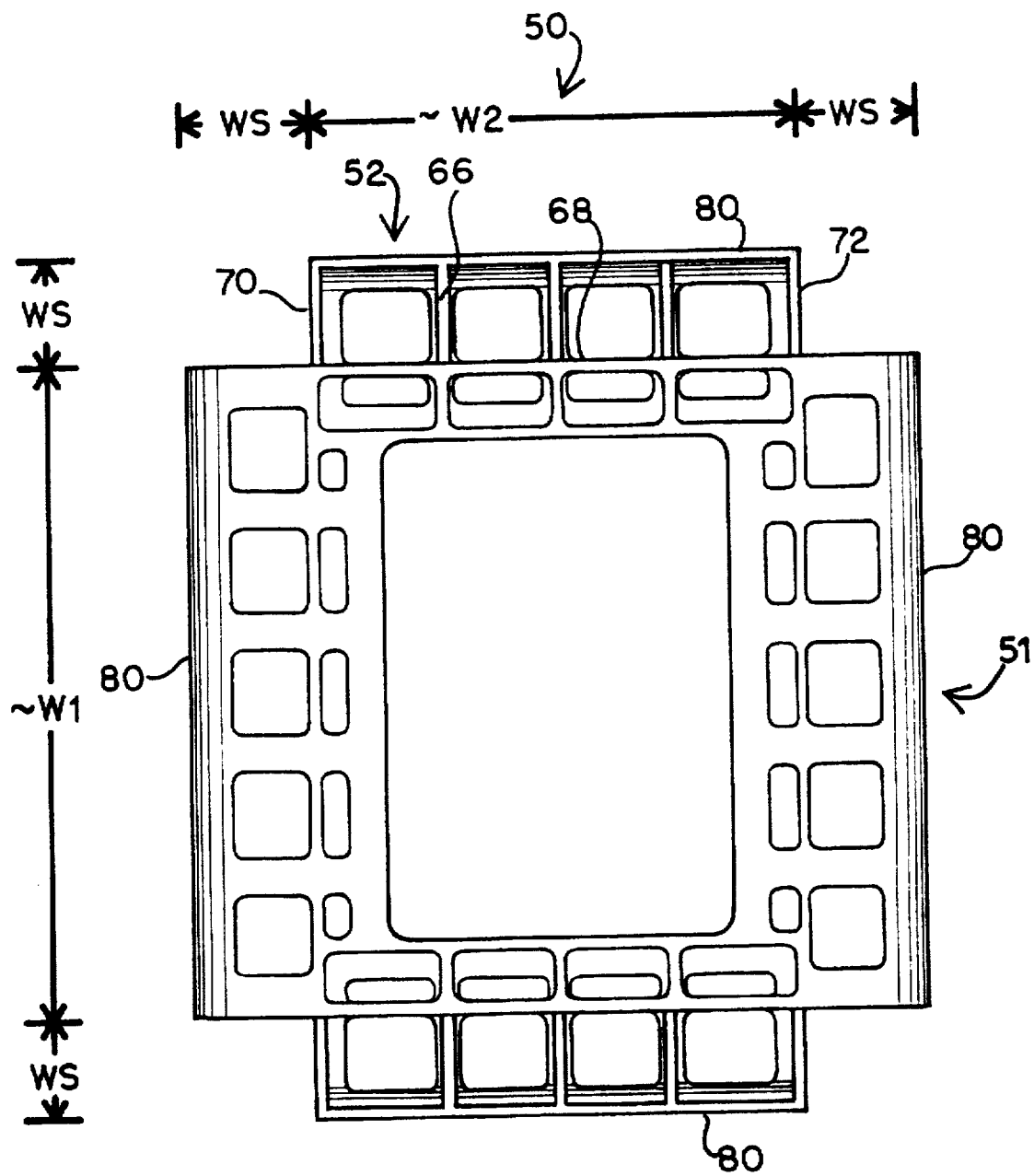
FIG. 5 is a bottom view of the embodiment of FIG. 3.

This first set 51 and second set 52 of surfaces of guide 50 cooperate with each other and with two different widths of I-beams, as described above for the guide 10 of FIG. 1. As shown in FIGS. 2–5, the lower plate 76 is sized appropriately to be placed in a first width of I-beam. Small gaps (preferably, about ⅛–⅜ inches exist) between the brace surfaces 60, 62 and the inner surfaces 38, 40 of the edge bars 34, 36. The support surface 56 is a part of lower plate 76 near end 79. Support surface 56 extends out beyond the guide surface 58, which is at the side edge 81 of the upper plate 78. As shown in FIG. 4, the upper plate 78 does not cover the lower plate 76 top support surface 56. To use the guide 50 with an I-beam of another size, the guide 50 is turned 90° flipped over, and placed onto the I-beam for which the second set 52 of surfaces is sized. In this second orientation, the upper plate 78 is now in the bottom position, lying towards the central panel of the I-beam and in between the edge bars.

Preferably, in each orientation of the guide 50, the plate in the top position extends over the edge bar top surfaces to rest on the edge bars 34, 36, and the plate in the bottom position is close to (or, optionally, may rest on) the center panel 42 of the I-beam. Preferably, the guide 50 is so strong and inflexible that there is no bowing of the guide 50 down into the web section even if the plate in the bottom position does not rest on the top surface of the center panel 42.

Thus, the thickness of each plate 76, 78 may be equal to, or preferably less than, the distance that each edge bar 34, 36 extends up from the top surface of the center panel 42.

The two-plate design of the preferred guide 50 allows all four edges, or, in other words, both ends and both side edges, of each plate 76, 78 to be used for functional surfaces, or, in other words, the guide 50 has two "first sets" of surfaces 51 and two "second sets" of surfaces 52. This symmetrical and "four-sided" design gives the carpenter extra flexibility and convenience in placement of the guide 50 and provides back-up functional surfaces in case some surfaces are nicked or otherwise damaged, or in case he wants to trim opposite support surfaces for use with different saws.

The outer edges 80 of the support surfaces at the ends of the two plates 76, 78 are preferably rounded or slanted, which helps provide an easy grip for removing the guide 50 from the I-beam and makes handling of the guide 50 comfortable and convenient.

Figure 2:
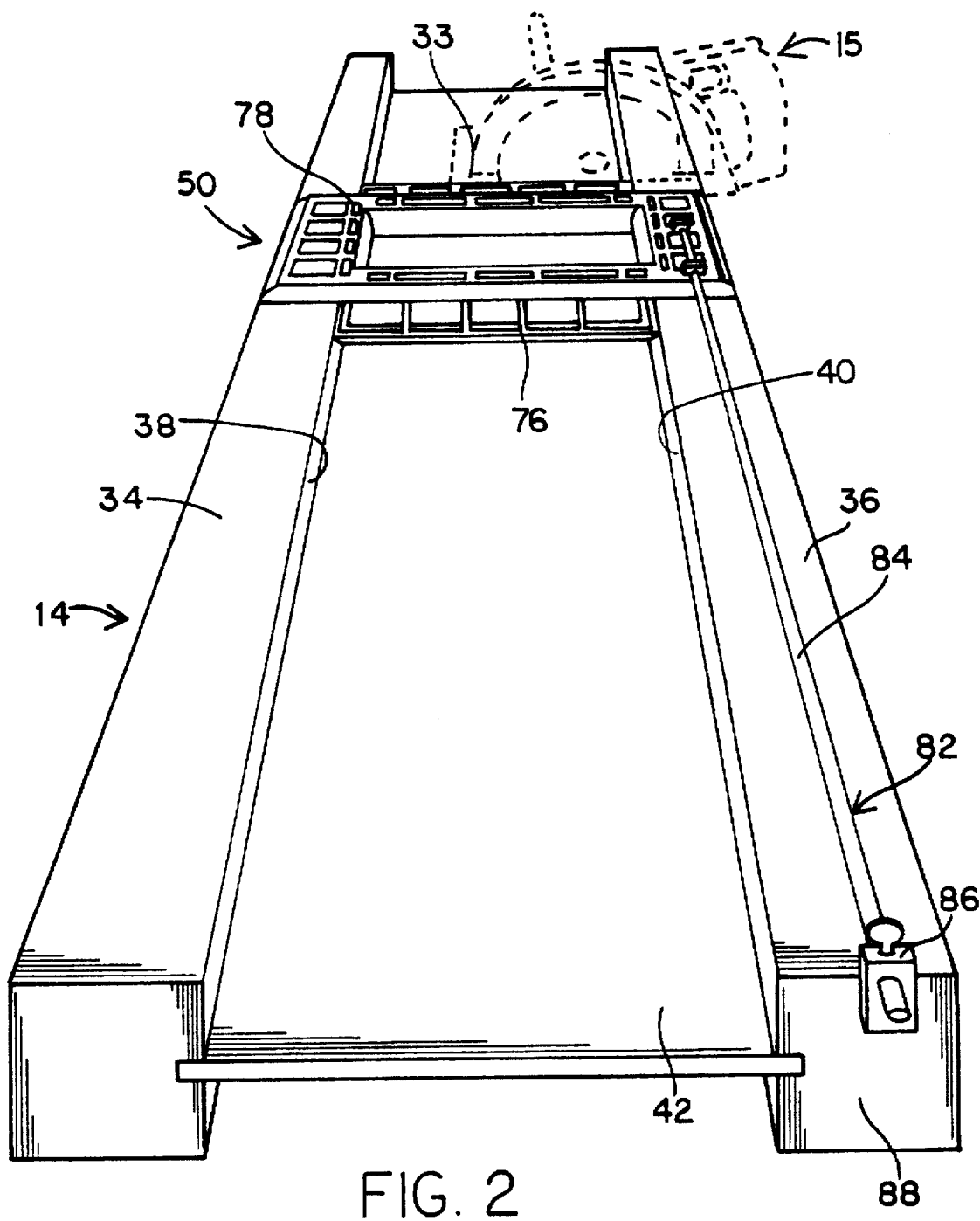
FIG. 2 is a perspective view of another embodiment of the invention with a measuring bar, installed on an I-beam and shown with a saw, in dashed lines, cutting into the I-beam.
Figure 3:
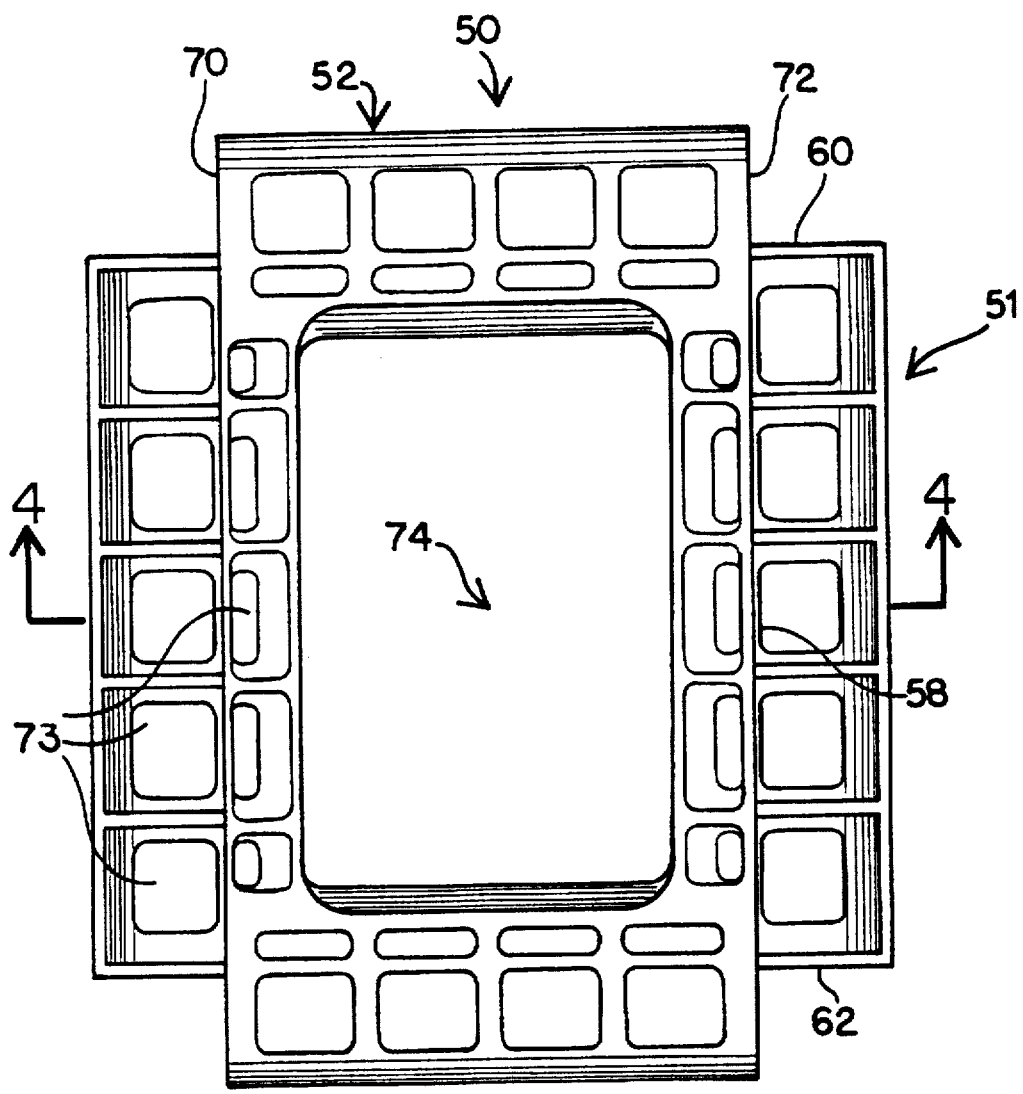
FIG. 3 is a top view of the embodiment of the guide depicted in FIG. 2, with the measuring bar removed.

An optional measuring means 82 is shown in FIG. 2 as a bar-and-stop member that extends out from the guide 50. The bar 84 removably connects to the top of the guide 50, onto whichever plate 76, 78 is positioned on top, by a snap-in, bolt-in, or other connection means. A slidable, lockable stop 86 is connected to the bar 84 for being locked into a desired position representing a desired distance from the cutting line. The stop 86 position may be predetermined by measurement with a tape measure or may be set once the guide is positioned on the I-beam. The stop 86 is for placement against the end 88 of the I-beam, to place and hold the guide 50 at the desired distance from the beam end 88 for cutting a desired length or "block" of beam. Thus, when the carpenter is repeatedly cutting the same length of block, he may set the stop once and then, after cutting, may pick up the guide 50 with attached measuring means 82, and place it for another cut without remeasuring or rechalking. Because the saw cuts right beside the outer edge 80 of the guide, the distance from the stop 86 to the outer edge 80 is approximately equal to the distance from the beam end 88 to the cutting line.

In the preferred embodiment, the dimensions of each plate 76, 78 may be described as functions of the widths of the I-beams and the dimensions of the saw for which the guide is designed. The plate 76 in FIG. 2 and 3 may be described as having a width nearly equal to the width of web of I-beam$_1$ (W1) and a length nearly equal to the width of I-beam$_2$ (W2) plus approximately two times the width of the saw (WS) from the saw blade to the outer edge of the saw side-extension 33. The plate 78 may be described as having a width nearly equal to W2 and a length nearly equal to W1 plus two times WS.

The first and second set of surfaces are preferably in rigid and fixed relationship to each other. In the embodiments above, the first and second set of surfaces are described as generally 90° to each other to describe the preferred rectangular plates and for ease and clarity of description. However, other angles besides 90° could be used, for example, to make a guide of other parallelogram-shaped plates for use in cutting across I-beams at an angle.

The terms "horizontal", "vertical", "generally horizontal", or "generally vertical" have been used when describing the relationships of the support surfaces, guide surfaces, and brace surfaces. These terms are used for clarity of description, but are not intended to limit the invention to embodiments in which the functional surfaces are exactly 90° to each other or are perfectly flat, for example.

The terms "fit with" or "fits onto" the I-beam or "fits between" the edge bars means that the brace surfaces lie between the edge bars. Preferably, the brace surfaces touch or come within about ⅛–⅓ inch of the inner surfaces of the edge bars.

The preferred material for the guide 50 is polypropylene, which may be economically molded into a light-weight, rigid, non-warping, and durable guide. Other materials may also be used, such as aluminum or wood.

In using the invented saw guide, the carpenter typically measures and marks a distance from an end of an I-beam to a place where he wishes to make a cut. He then places the invented guide onto the central panel or "web section" with the guide outer edge aligned with the mark at the desired cut location. Holding the guide securely with one hand, he saws across the I-beam with the help of the support and guiding surfaces of the guide. Alternatively, the carpenter may use a guide with a measuring means attached and, after presetting the measuring means to a desired length, he may repeatedly place the guide on the I-beam and cut lengths of beam without remeasuring or remarking.

In using the invented saw guide, the guide is usually held against one of the edge bars inner surfaces and prevented from rotating by the brace surfaces, so that the carpenter may easily hold the guide with one hand and make an accurate, straight cut through the edge bars and the web section. The guide stabilizes the saw and prevents any jolt, twist, or dip in the saw movement, thus, making a safer and smoother saw operation.

Although this invention has been described above with reference to particular means, materials, embodiments, and methods, it is to be understood that the invention is not limited to these disclosed particulars, but extends instead to all equivalents within the scope of the following claims.

We claim:

1. A saw guide for cutting I-beams, the saw guide comprising:

a generally rectangular lower plate having two ends and two sides, the two sides being two parallel brace surfaces, said lower plate further having a generally flat top support surface near one of said ends; and a generally rectangular upper plate also having two ends and two sides, one of the two sides of said upper plate being a generally flat guide surface;

wherein:

the upper plate is on top of and generally parallel to the lower plate; and the upper plate is attached to the lower plate in rigid and fixed relation;

the upper plate does not cover the lower plate top support surface;

the lower plate brace surfaces and top support surface and the upper plate guide surface are oriented generally 90° to each other; and the saw guide is without any moveable parts.

2. The saw guide of claim 1 comprising:

two sets, a first set and a second set, of brace surfaces, top support surface and guide surface.

3. The saw guide of claim 1 comprising a central opening for a hand grip.

4. The saw guide of claim 1/wherein the brace surfaces are about 8⅞ inches apart, the top support surface is about 8⅞ inches long, and the guide surface is about 11⅞ inches long.

5. The saw guide of claim 1 wherein the brace surfaces are about 6½ inches apart, the top support surface is about 6½ inches long, and the guide surface is about 9½ inches long.

6. The saw guide of claim 2 wherein the first set brace surfaces are about 8⅞ inches apart, the first set top support surface is about 8⅞ inches long, and the first set guide surface is about 11⅞ inches long, and the second set brace surfaces are about 6½ inches apart, the second set top support surface is about 6½ inches long, and the second set guide surface is about 9½ inches long.

7. A saw guide for cutting an I-beam having a web and two edge bars, the saw guide comprising:

a. a generally rectangular lower plate for placement on an I-beam web, the lower plate having two ends and two sides, the said two sides being two parallel brace surfaces for bracing the saw guide against the I-beam edge bars, and the lower plate further having a generally flat top support surface near one of the said ends for supporting a side-extension of a saw;

b. a generally rectangular upper plate having two ends and two sides, one of the two sides of said upper plate being a generally flat guide surface oriented generally 90° to the lower plate top support surface for guiding the saw in a straight line;

wherein:

i. the upper plate is on top of and generally parallel to the lower plate the upper plate is attached to the lower plate in rigid and fixed relation, and the upper plate guide surface is oriented generally 90° to the lower plate top support surface for guiding the saw in a straight line;

ii. the upper plate does not cover the lower plate top support surface; and iii. the upper plate guide surface is generally 90° to the lower plate brace surfaces;

whereby the side extension of a saw is supported on the lower plate top support surface and guided by the upper plate guide surface along a straight line generally 90° to the I-beam edge bars; and c. wherein the saw guide is without any movable parts.

8. The saw guide of claim 7 comprising:

two sets, a first set and a second set, of brace surfaces, top support surface and guide surface.

9. The saw guide of claim 7 comprising a central opening for a hand grip.

10. The saw guide of claim 7 wherein the brace surfaces are about 8⅞ inches apart, the top support surface is about 8⅞ inches long, and the guide surface is about 11⅞ inches long.

11. The saw guide of claim 7 wherein the brace surfaces are about 6½ inches apart, the top support surface is about 6½ inches long, and the guide surface is about 9½ inches long.

12. The saw guide of claim 8 wherein the first set brace surfaces are about 8⅞ inches apart, the first set top support surface is about 8⅞ inches long, and the first set guide surface is about 11⅞ inches long, and the second set brace surfaces are about 6½ inches apart, the second set top support surface is about 6½ inches long, and the second set guide surface is about 9½ inches long.

13. A saw guide for cutting I-beams consisting of:

a generally rectangular lower plate having two ends and two sides, the two sides being two parallel brace surfaces, said lower plate further having a generally flat top support surface near one of said ends; and a generally rectangular upper plate also having two ends and two sides, one of the two sides of said upper plate being a generally flat guide surface;

wherein;

the upper plate is on top of and attached to the lower plate in rigid, fixed and generally parallel relationship to said lower plate;

the upper plate does not cover the lower plate top support surface; and the lower plate brace surfaces and top support surface and the upper plate guide surface are oriented generally 90° to each other.

14. The saw guide of claim 13 wherein the upper and lower plates comprise:

two sets, a first set and a second set, of brace surfaces, top support surface and guide surface.

15. The saw guide of claim 13 wherein the brace surfaces are about 8⅞ inches apart, the top support surface is about 8⅞ inches long, and the guide surface is about 11⅞ inches long.

16. The saw guide of claim 13 wherein the brace surfaces are about 6½ inches apart, the top support surface is about 6½ inches long, and the guide surface is about 9½ inches long.

17. The saw guide of claim 14 wherein the first set brace surfaces are about 8⅞ inches apart, the first set top support surface is about 8⅞ inches long, and the first set guide surface is about 11⅞ inches long, and the second set brace surfaces are about 6½ inches apart, the second set top support surface is about 6½ inches long, and the second set guide surface is about 9½ inches long.

18. A saw guide for placement on an I-beam for use in cutting an I-beam having a web and two edge bars, the saw guide comprising:

first and second ends and two sides, the two sides being two parallel brace surfaces for bracing the saw guide against the two edge bars of an I-beam;

a generally flat top support surface near said first end for supporting a saw as it cuts across the I-beam; and a guide surface upending fixedly rigidly and generally vertically from the top support surface at a fixed distance from said first end, the guide surface being perpendicular to the top support surface and to said two parallel brace surfaces, and being for guiding the saw in a straight line along a desired cutting path;

wherein the saw guide is without any movable parts.

19. The saw guide of claim 18 comprising:

two sets, a first set and a second set, of brace surfaces, top support surface and guide surface.

20. The saw guide of claim 18 comprising a central opening for a hand grip.

21. The saw guide of claim 18 wherein the brace surfaces are about 8⅞ inches apart, the top support surface is about 8⅞ inches long, and the guide surface is about 11⅞ inches long.

22. The saw guide of claim 18 wherein the brace surfaces are about 6½ inches apart, the top support surface is about 6½ inches long, and the guide surface is about 9½ inches long.

23. The saw guide of claim 19 wherein the first set brace surfaces are about 8⅞ inches apart, the first set top support surface is about 8⅞ inches long, and the first set guide surface is about 11⅞ inches long, and the second set brace surfaces are about 6½ inches apart, the second set top support surface is about 6½ inches long, and the second set guide surface is about 9½ inches long.

* * * * *